Dec. 4, 1945.　　　　O. B. HOPPER　　　　2,390,149
ARC WELDING DEVICE
Filed Nov. 2, 1943
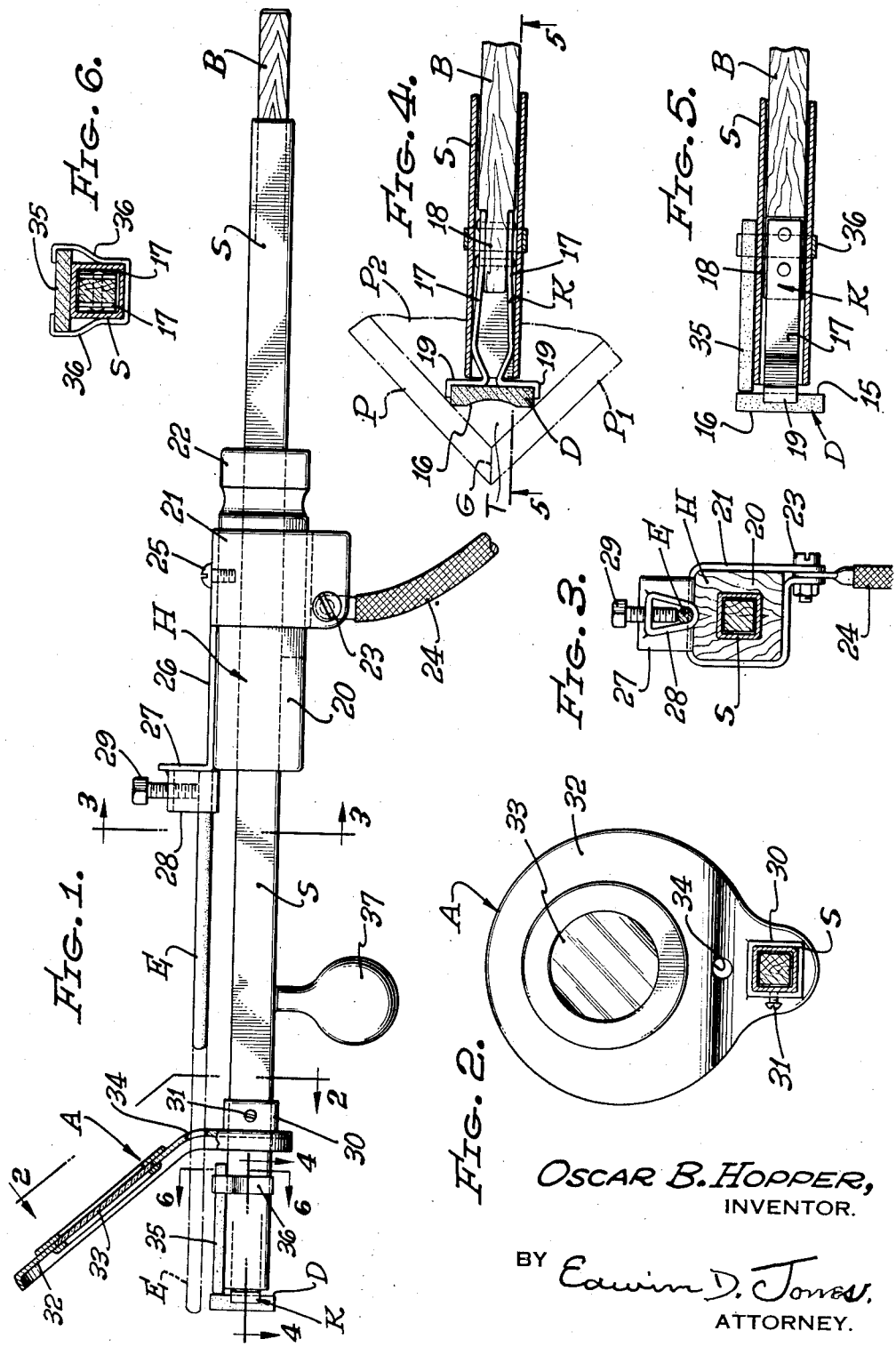
OSCAR B. HOPPER,
INVENTOR.
BY Edwin D. Jones
ATTORNEY.

Patented Dec. 4, 1945

2,390,149

UNITED STATES PATENT OFFICE 2,390,149

ARC WELDING DEVICE

Oscar B. Hopper, Long Beach, Calif.

Application November 2, 1943, Serial No. 508,657

1 Claim. (Cl. 219—8)

My invention relates to the art of arc-welding of seams between two pieces of metal, and particularly although not necessarily, to the arc-welding of corner seams both inclined and vertical, between two pieces of heavy gauge metal.

In my copending application, Serial No. 484,872, filed April 28, 1943, is embodied a method of arc-welding vertical or inclined seams, which comprises progressively forming a pocket lengthwise of a seam, by movement of a mold therealong, and simultaneously flowing molten welding metal from a welding electrode, into the pocket successively as the latter is progressively formed, all in a manner to confine the molten metal to the seam and securely weld the seam in a continuous operation.

My present invention relates to devices or tools by which the aforestated welding method may be performed, and it has for a purpose the provision of such a device by which the welding method may be easily performed and with dispatch, through the mounting of the mold and the electrode upon a common support, and in such manner that the two are applicable to and simultaneously movable along the seam in the progressive formation of a pocket, and the successive flowing of metal from the electrode into the pocket.

It is also a purpose of my invention to provide an arc-welding device which further facilitates the performance of the aforedescribed method, by movably mounting the welding electrode on the support so that the electrode can be fed toward the seam as it melts away in a manner to maintain its arc-producing end in metal flowing position in respect to the pocket.

A further purpose of my invention is the provision of an arc-welding device of the character aforedescribed which embodies a shield mounted on the common support and positioned to protect the operator from spattering metal, and his eyes against the injurious effects of the arc, while at the same time permitting the operator to constantly view the weld as it is formed.

I will describe only one form of arc-welding device embodying my invention and will then point out the novel features thereof in the claim.

In the accompanying drawing:

Fig. 1 is a view showing in side elevation and partly in section, one form of arc-welding device embodying my invention.

Fig. 2 is a vertical sectional view taken on the line 2—2 of Fig. 1.

Fig. 3 is a vertical sectional view taken on the line 3—3 of Fig. 1.

Fig. 4 is a horizontal sectional view taken on the line 4—4 of Fig. 1 and showing the device applied to a corner seam to be welded.

Fig. 5 is a vertical sectional view taken on the line 5—5 of Fig. 4.

Fig. 6 is a vertical sectional view taken on the line 6—6 of Fig. 1.

Similar reference characters refer to similar parts in each of the several views.

My invention in this particular embodiment comprises a portable support S which may be in the form of a rod, preferably made of metal and tubular from end to end. To prevent rotation of the elements which it supports, the rod is of non-circular form in cross section, and preferably square.

At the forward or leading end of the rod S is carried a mold D formed of suitable refractory material such as fire brick, and which in its present form is in block shape with a plane rear side 15 and a concave front side 16, and of a width to span the corner of a seam to which it is applied when in use, as illustrated in Fig. 4.

The mold D is detachably secured at the forward end of the rod S to allow of replacement of a burned and improperly shaped mold as it will become as a result of continued use, by a new mold. The means for so securing the mold on the rod may comprise a clamp K made up of a pair of outwardly bowed spring arms 17 secured at their rear ends to the reduced end 18 of a bar B, and formed at their forward ends with a pair of jaws 19, between which the block mold D is adapted to be received and held.

The bar B which is preferably formed of an electrical insulating material to protect the operator against possible electric shock, has the same cross-sectional form as the interior of the rod S so as to be slidably received therein but not rotatable therein. The length of the bar is such that its rear end projects from the rear end of the rod to be gripped by the operator and moved forwardly to effect release of the mold D by the clamp K when a new mold is to be substituted.

Upon forward movement of the bar B the arms 17 are advanced a distance sufficient to project the bowed portions thereof from the forward end of the rod S, thus allowing the arms to spring outwardly from each other and thus spread the jaws 19 to release the mold D. Once a new mold has been placed between the jaws they may be moved into firm gripping relation to the mold by pulling the bar rearwardly in the rod until the bowed arm portions have been retracted into the rod, when the arms are contracted to actuate the jaws.

In addition to providing a manipulating support for the mold D in its use in arc-welding a seam, the rod S provides a manipulating support for a welding electrode E, and in such manner that the arc-producing end of the electrode may be positioned as shown in broken lines in Fig. 1 and the electrode advanced by the operator as it melts away to maintain such position in order that metal therefrom may be constantly flowed into the pocket formed between the two pieces of metal to be welded and the mold when the latter is positioned as shown in Fig. 4.

In order that the electrode E may be supported and manipulated as above described, a holder H for the electrode is provided. This holder may comprise a sleeve 20 of suitable electrical insulating material, having a bore square in cross section so as to be slidable but not rotatable on the rod S.

Secured to the sleeve 20 is an electrical conducting frame which may comprise a square split band 21 extending about the sleeve at a point adjacent the rear end thereof, so as to leave a projecting portion 22 which may be grooved or otherwise shaped to provide a handle by which the holder H as a unit can be advanced or retracted as required.

As shown in Fig. 3, the ends of the band 21 may have a bolt 23 extended therethrough to secure the band on the sleeve and to provide a connection for a cable 24 by which current can be supplied to the electrode E through the frame. A screw 25 may be extended through the top of the band and into the sleeve, to provide as added means for securing the band in fixed position on the frame.

The frame also includes a forward extension 26 integral with the band 21 and upturned at its forward end to provide a flange 27 to which is welded a socket 28. In this socket is received the rear end of the electrode E, and the electrode is detachably secured therein so as to be extended forwardly in a plane paralleling that of the rod S, by a set screw 29 threaded in the socket.

For the purpose of preventing molten metal spattering from the arcing end of the electrode against reaching the operator, and also protecting the operator's eyes against the injurious effects of the arc and yet permitting the operator to view the weld as it is formed, my device includes a shield designated generally at A. This shield may comprise a square sleeve 30 for receiving the rod S, which is provided with a set screw 31 by which it can be secured in the desired position longitudinally on the rod. A metal plate 32 of substantially disc shape is formed integral with and extends laterally from the sleeve 30 so as to be positioned in protective relation to the operator holding the device, against metal spattering from the electrode.

The plate 32 is provided with an opening spanned by a window 33 made of any suitable transparent material such as glass colored to be light selective so as to protect the operator's eyes from the injurious rays of the welding arc and yet permit viewing of the weld as it is formed.

In order that the electrode E may be extended through the shield A to bring its leading end into arc-producing position with respect to the work to be welded, the shield is formed with an orifice 34 alined with the electrode and through which the electrode may freely pass.

Where the rod S is formed of metal or any other material to which the molten metal from the arcing electrode might adhere, or excessively heat, a protecting plate 35 for that portion of the rod immediately to the rear of the mold D is provided. This plate is preferably constructed of refractory material, and is detachably secured to the rod by a spring clip 36 (Fig. 6) engaging the rod and the rear end of the plate so as to hold the forward end of the plate in abutting relation to the mold and in covering relation to that side of the rod between the mold and the shield.

In the use of my device the rod S is held in one hand by the operator, through the medium of a knob 37 secured to the rod, and so that the mold D is positioned against and in spanning relation to the two pieces P and P1 of metal to be joined at the corner seam G, and at the lower extremity of the seam which is spanned by a cross piece P2 of metal upon which the pieces P and P$^1$ are supported during the welding operation, all as illustrated in Fig. 4.

Accordingly, the two pieces of metal P and P$^1$ coact with the mold D to form the sides of a pocket T, while the cross piece P$^2$ forms the bottom of the pocket.

With the pocket so formed the other hand of the operator grips the handle 22 and moves the holder H forwardly to extend the electrode E through the shield opening 34 and its leading end into arc-producing position with respect to the seam G, as shown in dash lines in Fig. 1. Once the arc is formed molten metal from the electrode flows into the top of the pocket T, to fill the latter. When this metal solidifies in whole or in part, a second pocket can be formed above the first by moving the mold D upwardly of the seam a distance slightly less than the height of the mold so that the top of the metal in the lower pocket may form the bottom of the upper pocket.

With such elevation of the mold D, which is effected by elevating the rod S, the electrode E is likewise elevated to immediately flow metal therefrom into this upper or second pocket. Once the metal in this second pocket solidifies sufficiently to form a support for the succeeding metal to be flowed, the mold and the electrode are again simultaneously elevated along the seam as before, to produce a third pocket into which metal from the electrode is immediately flowed.

Thus it will be clear that by the operator continuing these successive movements of the device throughout the length of the seam, a continuous weld of great strength can be formed; and as these movements of the device can be performed in rapid succession the welding operation becomes continuous. Also, because the mold at all times confines the molten metal from the electrode to the pockets, effective welding of the seam can be performed with practically no loss of welding metal. To compensate for the constant decrease in length of the electrode E resulting from the molten metal being dispensed therefrom during the welding operation, and in such manner that the leading end of the electrode can be maintained in arc-producing position in respect to the mold pocket as the latter is progressively formed, the holder H being slidable on the rod S allows the operator to feed the electrode forwardly to the work so that molten metal can be constantly flowed into the pocket throughout the length of the seam.

During the aforedescribed use of my welding device, it will manifest that the shield affords the desired protection to the operator against spattering metal as it overlies the arcing end of the electrode, while the window allows the operator to view the weld in its formation and without injury to the eyes.

I claim:

A welding device comprising: a hollow rod of non-circular cross section; a bar slidably fitted in said rod and longitudinally movable from one end of the rod to occupy advanced and retracted positions; a mold clamp on one end of said bar movable to grip or release a mold according as said bar is moved to retracted or advanced position; and an electrode holder slidable but non-rotatable on said rod to allow manual feeding of the electrode longitudinally of the rod and toward the mold end of the latter.

OSCAR B. HOPPER.